United States Patent [19]
Cook et al.

[11] Patent Number: 6,061,726
[45] Date of Patent: May 9, 2000

[54] DYNAMIC RIGHTS ASSIGNMENT APPARATUS AND METHOD USING NETWORK DIRECTORY SERVICES

[75] Inventors: Randall R. Cook, Springville; Nicholas Huston Franklin, Lehi; Bill Guy Bodine, Orem; Calvin R. Gaisford, Provo; Matthew G. Brooks, Orem, all of Utah

[73] Assignee: Novell, Inc., Provo, Utah

[21] Appl. No.: 08/970,173

[22] Filed: Nov. 13, 1997

Related U.S. Application Data

[63] Continuation-in-part of application No. 08/863,860, May 27, 1997, Pat. No. 5,859,978.

[51] Int. Cl.[7] .................................................. G06F 15/173
[52] U.S. Cl. ........................ 709/226; 709/220; 709/225; 709/224
[58] Field of Search .................................... 709/200, 201, 709/223, 224, 225, 226, 229; 707/200, 201, 205

[56] References Cited

U.S. PATENT DOCUMENTS

| | | | |
|---|---|---|---|
| 5,423,034 | 6/1995 | Cohen-Levy et al. | 707/10 |
| 5,761,499 | 6/1998 | Sonderegger | 707/10 |
| 5,774,656 | 6/1998 | Hattori et al. | 709/223 |
| 5,859,978 | 1/1999 | Sonderegger et al. | 709/226 |
| 5,893,107 | 4/1999 | Chan et al. | 707/103 |
| 5,893,116 | 4/1999 | Simmonds et al. | 707/201 |
| 5,893,118 | 4/1999 | Sonderegger | 707/203 |

*Primary Examiner*—Glenton B. Burgess
*Assistant Examiner*—Abdullahi E. Salad
*Attorney, Agent, or Firm*—Madson & Metcalf

[57] ABSTRACT

A directory services system includes a resource object, such as an application object for accessing an actual resource associated with the resource object. Rights attributes of the resource object reflects information for controlling rights of a user (or entity) to access the actual resource. The rights attributes may include criteria for distribution. The rights attributes may be used to rapidly, dynamically, remotely, and easily define and control access to available instances of a resource object based on certain criteria, such as organization, membership, etc. A utility (snap-in) module may be relied upon to manage the values of the attribute. Application programming interfaces (executables) in a dynamically linked library may be provided to "consume" (use) the attributes in the resource objects stored in directory services database.

20 Claims, 12 Drawing Sheets

DYNAMIC RIGHTS ASSIGNMENT APPARATUS AND METHOD USING NETWORK DIRECTORY SERVICES

RELATED APPLICATIONS

This application is a continuation-in-part of and claims priority to U.S. patent application Ser. No. 863,860 filed May 27, 1997, now U.S. Pat. No. 5,859,978, which is incorporated herein by reference.

BACKGROUND

1. The Field of the Invention

This invention relates to networked computer systems and, more particularly, to novel systems and methods for providing file rights management, using directory services systems, as well as rapid, robust, dynamic assignment of file rights with reduced effort.

2. The Background Art

The present invention relies on, and improves upon, the management of application programs in a computer network by an application launcher or network application launcher programmed for managing applications in a multi-server network through the use of application objects in a directory services database. This technology is described in U.S. patent applications, Ser. No. 08/499,711 now U.S. Pat. No. 5,692,129 directed to a network application launcher for managing applications in a network; Ser. No. 08/863,860 now U.S. Pat. No. 5,859,978 directed to a method and apparatus for managing applications in a network; and Ser. No. 08/940,789 still pending directed to a directory-services-based launcher for load-balanced, fault-tolerant, access to closest resources, incorporated herein by reference.

Modern computer networks connect numerous resources. Several servers (nodes) may be resources for numerous clients (nodes) as consumers. Resources such as software available on server and workstations may be administered by a "network administrator". A wide variety of application programs (e.g. word processors, spreadsheets, database managers, program development tools, and the like, collectively, "applications"), are typically available on one or more servers to one or more consumers in the network. Necessary file access rights and execution environments must be provided to consumers (e.g. users, groups, supervisors, etc.) by the administrator. Users and other consumers need notification. Sometimes executable codes and other resources are scattered, and may be replicated, making administration difficult.

A network application launcher (e.g. Novell's NAL) provides computerimplemented methods and apparatus for consistently determining the nature and location of application program executable codes in a network, using directory services objects.

When users travel from one work site to another, they often prefer to maintain the performance and familiarity of the network they ordinarily use. Users who must work away from the normal place of business will typically have certain software applications and other resources on which they depend. An application is typically launched from a server where a user has established rights.

Even locally, and especially upon traveling to a remote location, a user may need to establish rights to access resources required to function effectively. Likewise, network administrators and users, alike typically desire the least time and interaction (maximum transparency) possible to access a resource, for example, to launch an application.

What is needed is a convenience for users and administrators for providing quickly, simply, reliably, and easily the desired rights required to obtain services and maintenance thereof on remote servers, and other nodes, in wide or local area networks. Dynamically providing rights to resources without slowly and laboriously removing and replacing data in numerous locations is needed. Rights, access, setup data, etc., need to take advantage of the advances in directory services.

BRIEF SUMMARY AND OBJECTS OF THE INVENTION

In general, any resource may be located and used (consumed) over a network by the appropriate service corresponding to the resource. Thus, herein, applications are used by way of example of a resource, and application objects are examples of any suitable resource object. Directory services objects are described in the art.

The present invention's methods and apparatus for centrally managing application programs in a computer network, may improve a Network Application Launcher (NAL) by modifying a directory services database schema and adding executables (e.g. utilities) for managing the information therein. The database schema defines consumers and resources that can be represented as consumer objects and resource objects, respectively, so network administrators have an efficient and effective way to make resources available to consumers on the network. Controlling organization, linking, rights assignments, and licensing or other access to a resource may be done simply, and transparently to network users, or groups of users, needing particular network resources.

The resources may be represented in a modified directory services database that includes resource (e.g. application) objects representing resources (e.g. application programs). Resources may include printers, peripherals, word processors and spreadsheets, and the like that are connected in the network. The modifications to the schema provided by the present invention support the creation, deletion, alteration, management, and consumption of attributes in application objects in the network directory services (DS or NDS) database. In one embodiment administrative routines for managing application objects are provided through "snap-in" modules that extend administration tools used, for example, in Novell NetWare networks' NW Admin module.

Each resource object may represent one instance of a resource. Resource objects may contain any or all types of attributes including file rights attributes, licensing attributes, foldering links, a site list, fault-tolerance list, and load-balancing list for identifying a closest available, equivalent instance of a resource (e.g. application), and a disabling flag for easily removing such availability.

Other functions may also be added. The new, functional attributes may store key information in the central DS database, which is managed through specified administrator tools and user interfaces. Snap-ins are added to these tools to manage the new attributes. Database updates are thus readily performed with the administrator tools. The application launcher is provided with application programming interfaces (APIs) in dynamic link libraries (DLLs) as executables for consuming the attributes in order to execute properly and transparently (to a user) the desired function for which an attribute exists.

To provide convenience for users, a system administrator may edit certain attributes in a resource object or consumer (user, group, container) object. These attributes may be created for distributing and specifying access and logical links between instances of objects. Thus, for example, even though different instances or copies of an application may be hosted on different servers, they are logically the same, and may be so identified by proper values of attributes in an application object. Similarly, a user object may also be represented as a member of a group corresponding to a group object. Objects require coordination with a parent (e.g. container) object, as well.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 12, is not intended to limit the scope of the invention, as claimed, but is merely representative of certain presently preferred embodiments of an apparatus and method in accordance with the invention. The presently preferred embodiments of the invention will be best understood by reference to the drawings, wherein like parts are designated by like numerals throughout.

Figure 1:
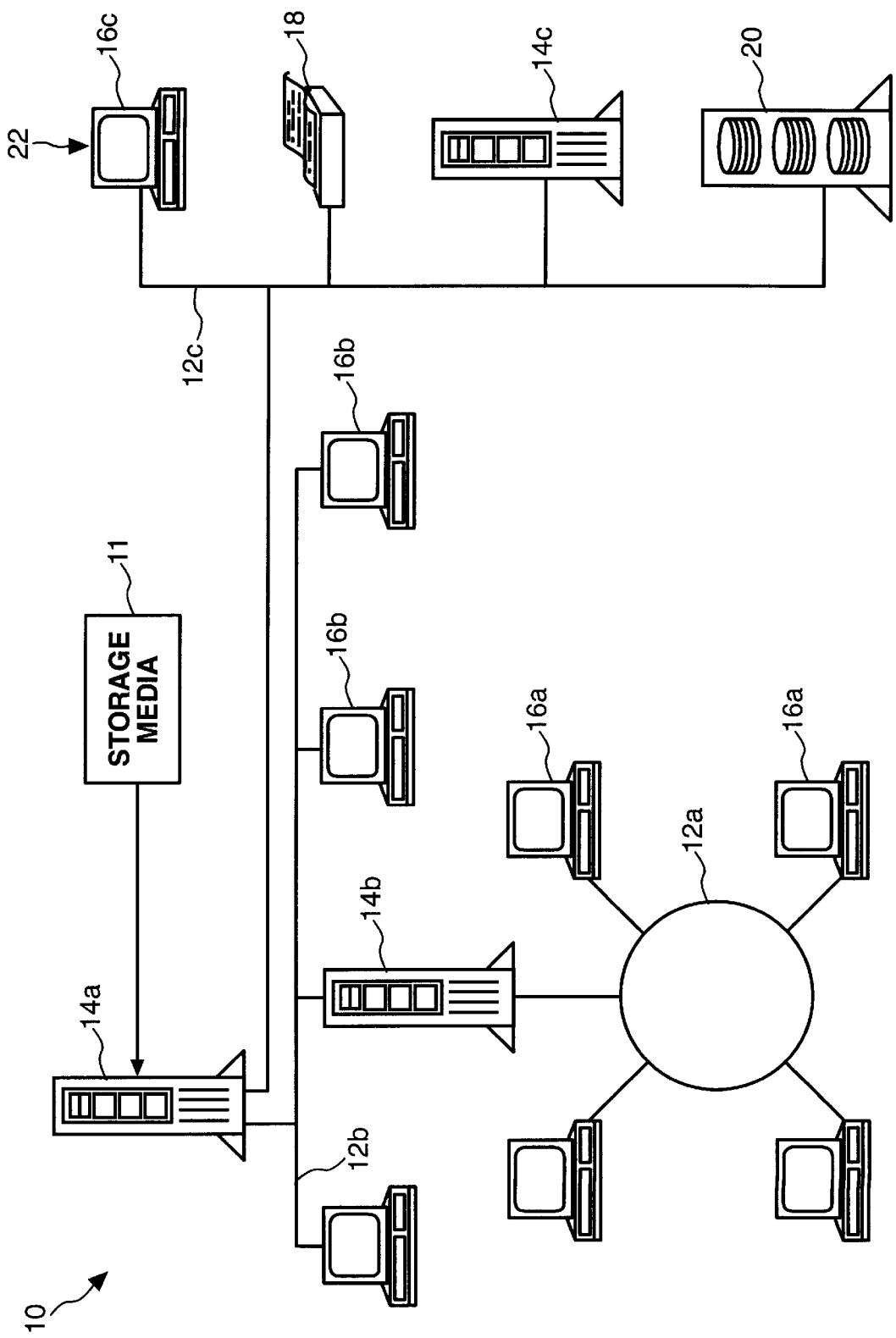
FIG. 1 is a schematic block diagram of a system of networked computers in accordance with the invention.

Referring to FIG. 1, a system 10 or network 10 of computers may include a storage medium accessible to one or more networks 12 (e.g. networks 12a, 12b, 12c). A network 12 may be provided service of files, applications, or other functions and data structures by a server 14 (e.g. servers 14a, 14b, 14c). Each network 12 may interconnect an appropriate number of nodes 16 or computers 16 of which a server 14 or router 14 may be warrant. In addition, various printers 18, storage devices 20, remote nodes 16 and the like may serve as resources 22 available to nodes 16 in the network 12.

Figure 2:
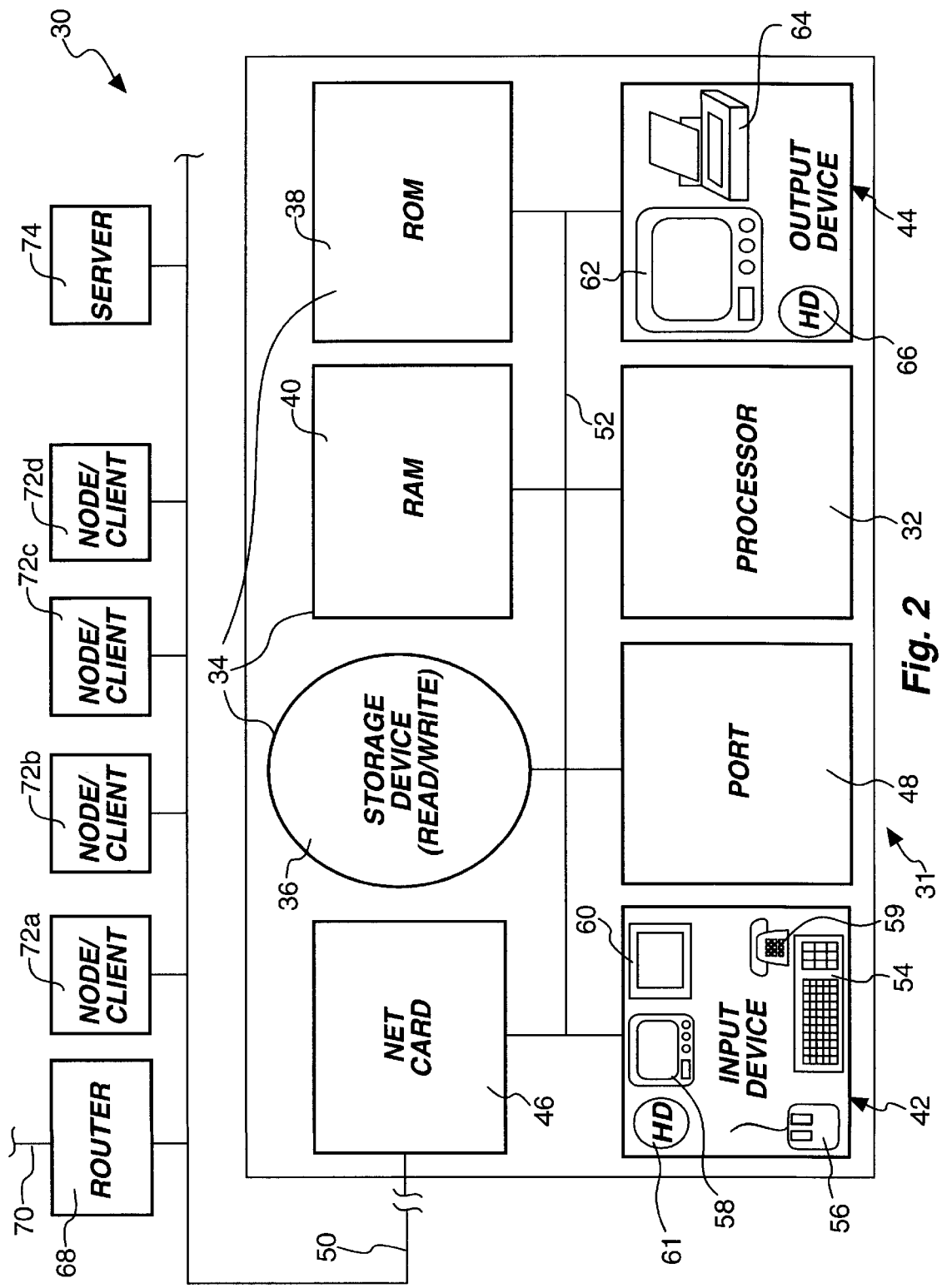
FIG. 2 is a schematic block diagram of an individual node in a network system such as that of FIG. 1.

Referring to FIG. 2, in general, any network 30 or apparatus 10, such as the network system 10 or apparatus 10 of FIG. 1, may include nodes 31 (e.g. nodes 14, 16, 70, 72, 74). Each node 31 may include a processor 32 and memory devices 34, such as storage devices 36, read only memory (ROM) 38, and random access memory (RAM) 40, sometimes referred to as operational memory. The node 31 may include a variety of input devices 42, and output devices 44 whether dedicated as illustrated in FIG. 2, or available over a network 12 of FIG. 1, as resources 22. Typically, a node 31 may include a network card 46 for connecting to a network 50 (e.g. network 12) outwardly, and a bus 52 for interconnecting elements internally.

Input devices 42 may include a keyboard 54, a mouse 56 or other pointing device such as a stylus or graphics tablet, a touch screen 58, a scanner 60, or even a storage device 61 for providing data to the node 31. Similarly, output devices 44 may include monitor 62, printer 64, storage devices 66, and the like for providing data from the node 31.

A router 68 may interconnect networks 50, 70 where each network 50, 70 may include several nodes 72, such as clients 72a–72d, and servers 74. Networks 12, 50, 70 are well understood in the art. Accordingly, the hardware illustrated is by way of an example, and not limitation, as to the hardware suite on which the invention may be implemented. More or less equipment may be used in many particular embodiments.

Figure 3:
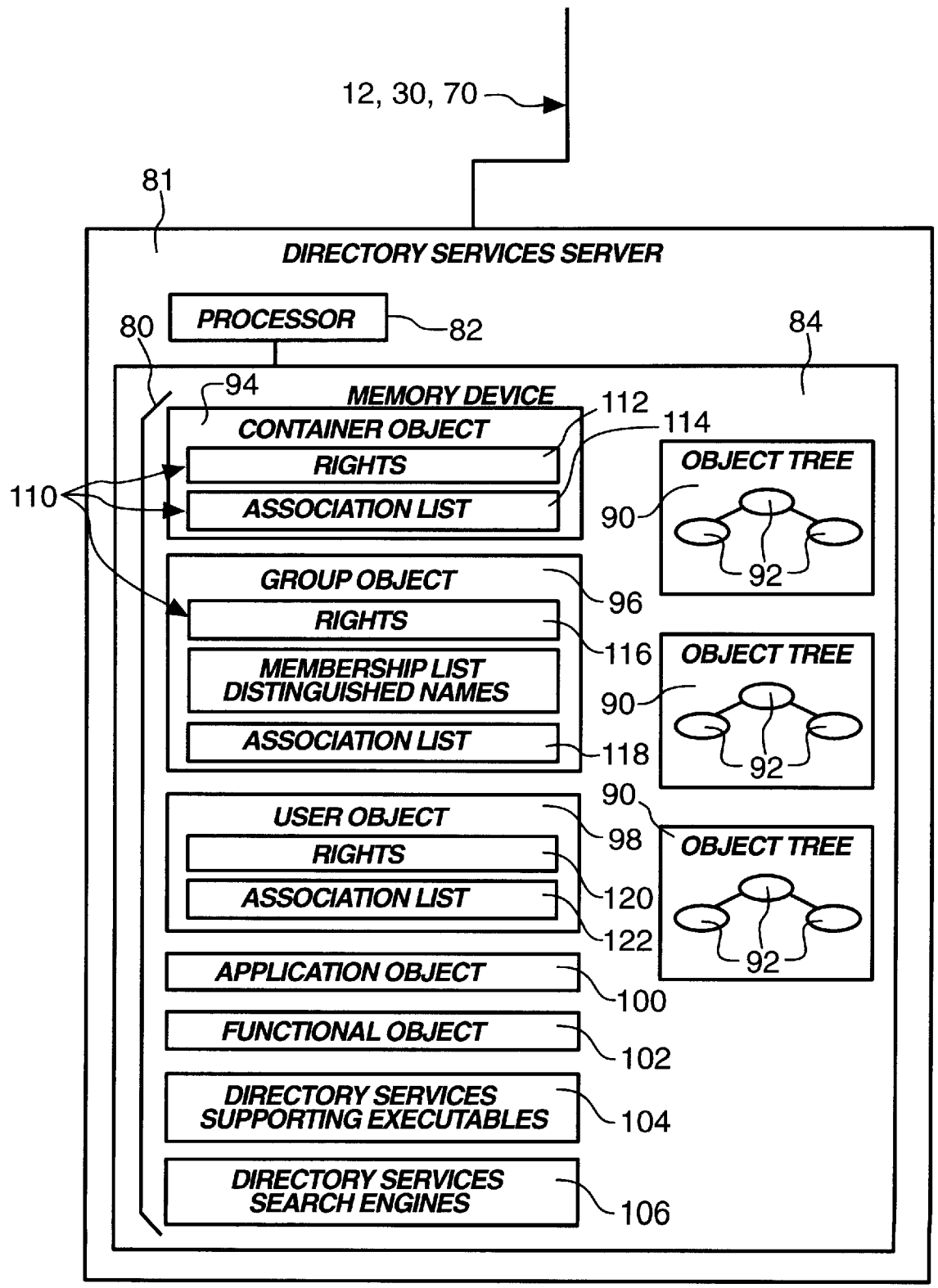
FIG. 3 is schematic block diagram of a directory services system on a server, such as a server of FIG. 1 and FIG. 2.

Referring to FIG. 3. directory services system 80 may be hosted on a directory services server 81 on one or more nodes 31, 72, 74. Executables and operational data in a directory services system 80 is typically highly distributed among individual nodes 31 (e.g. clients 72, servers 74, etc.) over interconnected networks 12, 30, 50, 70, and thus may be referred to simply as directory services, regardless of which particular data structures and hardware may be implicated or required for a particular task.

Nevertheless, a directory services system 80, 81 may include a processor 82 for executing executables. An executable may be any executable data structure from a single machine instruction to a sophisticated system of applications. The processor 82 may rely on a memory device 84 to create, manage, or store object trees 90 of individual objects 92 linked in a hierarchical relationship.

For example, container objects 94 can contain other objects, whereas a group object 96 merely contains information identifying relationships between objects 92, which need not be hierarchical. A user object 98 is one example of an object that may be identified by a group object 96, and contained in a container object 94 (a parent 94 to the leaf 98).

One very useful object 92 is an application object 100, identifying certain important information associated with an actual executable file corresponding to an application. Various application objects 100, 102 may be stored and related in object trees 90 in a directory services system 80. A directory services system 80 includes numerous executables 104 known in the art and well described elsewhere. Likewise, directory services search engines 106, or simply search engines 106, may include sophisticated methodologies for creating and executing queries to locate specific objects 92 in an object tree 90 within a directory services system 80.

One should keep in mind that, in general, a directory services system 80 may actually be distributed throughout the memory devices 11, 34, 84 of any appropriate number of networks 12, 30, 50, 70. Typically, an object 92 may be created to include methods 108, attributes 110, or both, as known in the art. For example, containers 94, groups 96, users 98, and resources (e.g. applications) 100 (abbreviating the names of these objects to a single word each) may each contain, respectively, certain rights 112, 116, 120 or rights attributes 112, 116, 120, and one or more association lists 114, 118, 122, for identifying other objects 92 having some relationship thereto.

Figure 4:
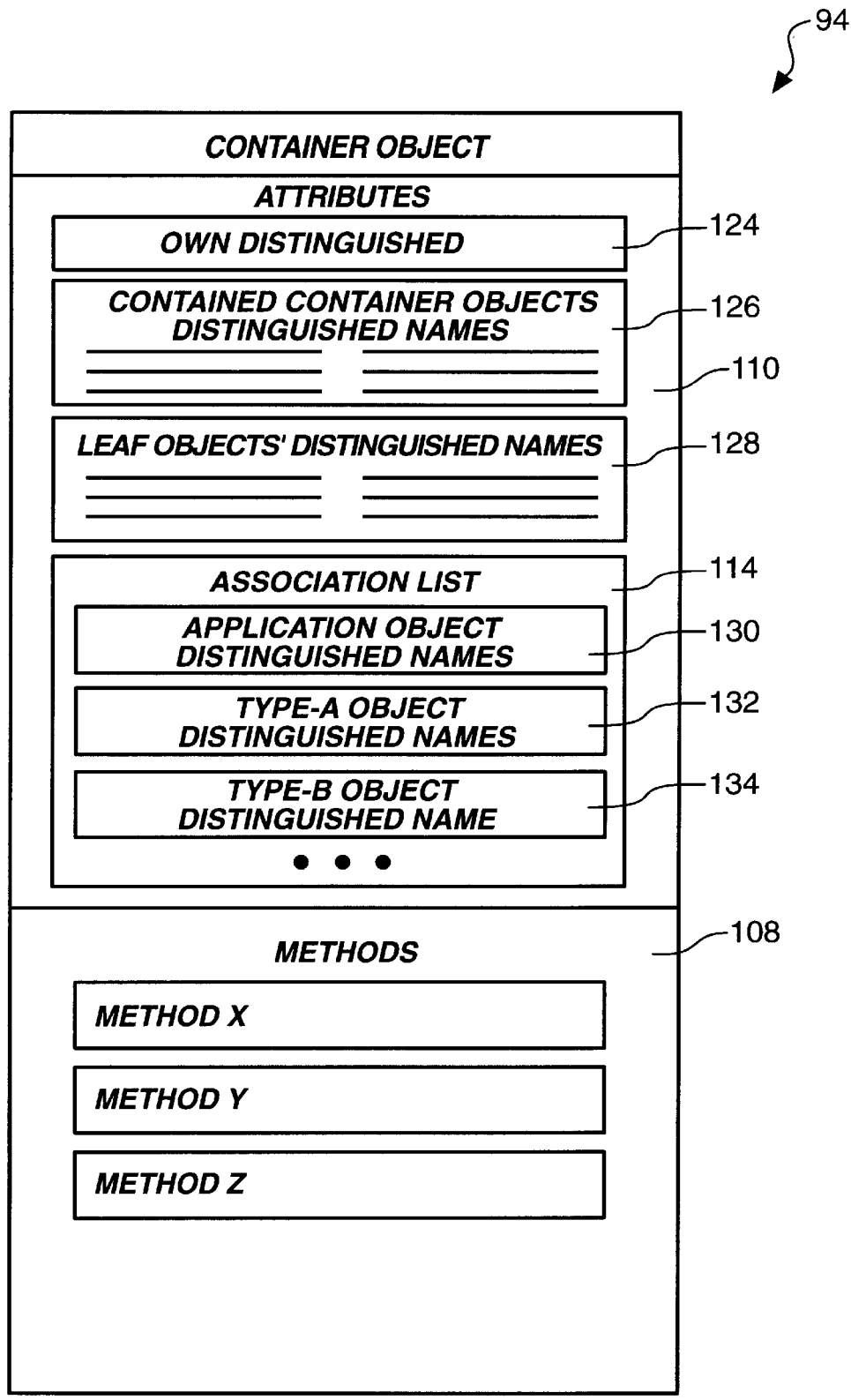
FIG. 4 is a schematic block diagram of a container object in a directory services system of FIG. 3.
Figure 5:
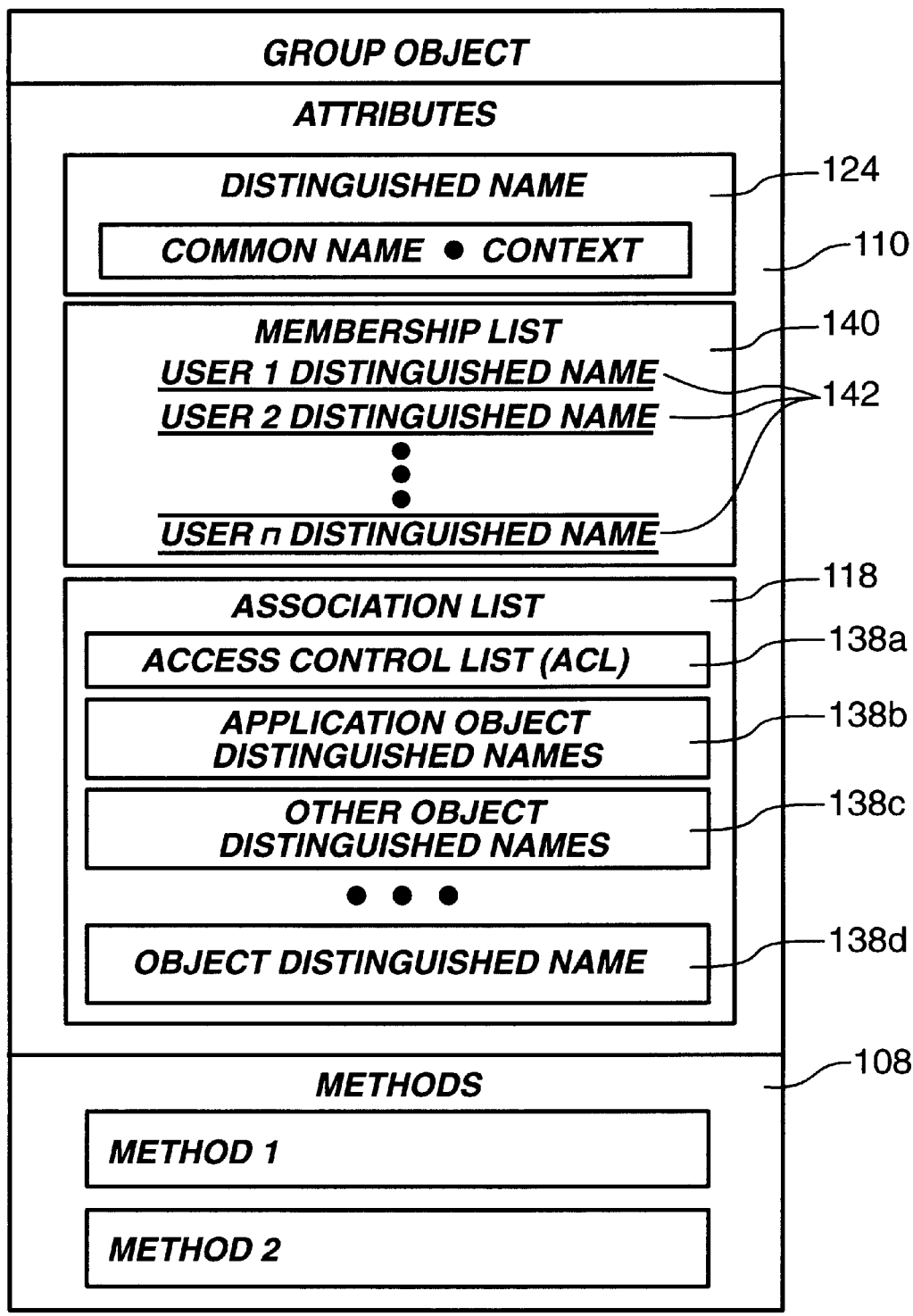
FIG. 5 is a schematic block diagram of a group object in a directory services system of FIG. 3.
Figure 6:
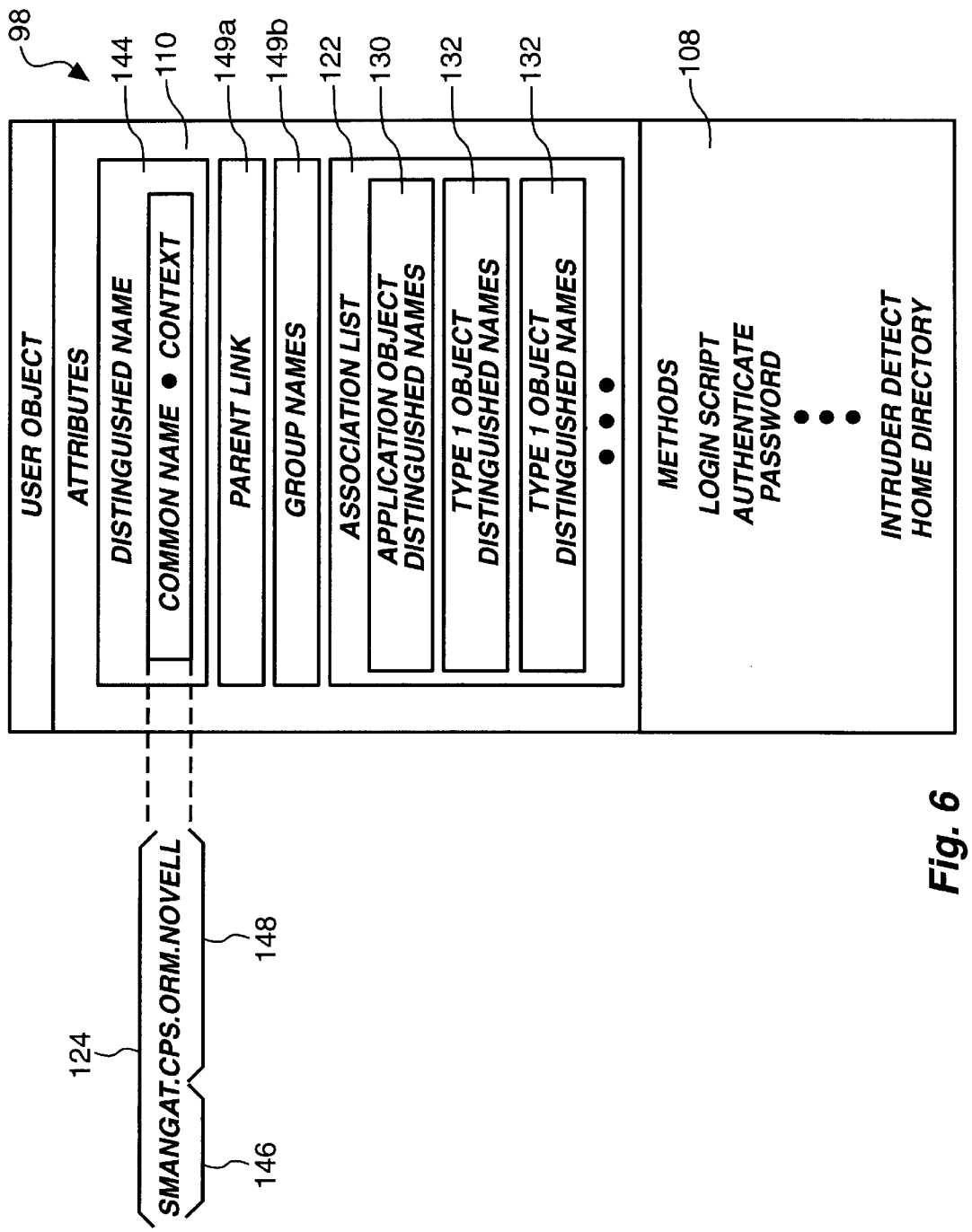
FIG. 6 is a schematic block diagram of a user object in the directory services system of FIG. 3.

Referring to FIGS. 4–6, in view of FIG. 3, an object 92, such as a container object 94, may include an attribute 110 of its own distinguished name 124. Likewise, for container objects 94, a list 156 of distinguished names contained therein or thereby is included, as well as a list 128 of leaf objects' distinguished names contained therein. The association list 114 may identify certain distinguished names 130, 132, 134 of application objects or other resource objects associated with the object 94, 96, 98 in question.

A group object 96 may include a binding data structure, typically an association list 118, identifying associations, such as, for example, access control lists 138*a*, application object distinguished names 138*b*, and distinguished names 138*c*, 138*d* of other associated resource and other objects. A group object 96 may also have certain unique attributes 110, such as a membership list 140 identifying the distinguished names 142 of all users or user objects 98 having membership in the group 96.

A user object 98 is associated with an individual user. The distinguished name 144 of FIG. 6 is exemplary of all distinguished names 124. Each distinguished name 124 typically includes a common name 146 in association with a context 148. Context 148 may include acronyms, abbreviations, or other identifications of organizations, geography, logical relationships, and enterprises, as illustrated. Context 148 is sometimes thought of as a logical path or may be so configured in a particular directory services system 80.

Figure 7:
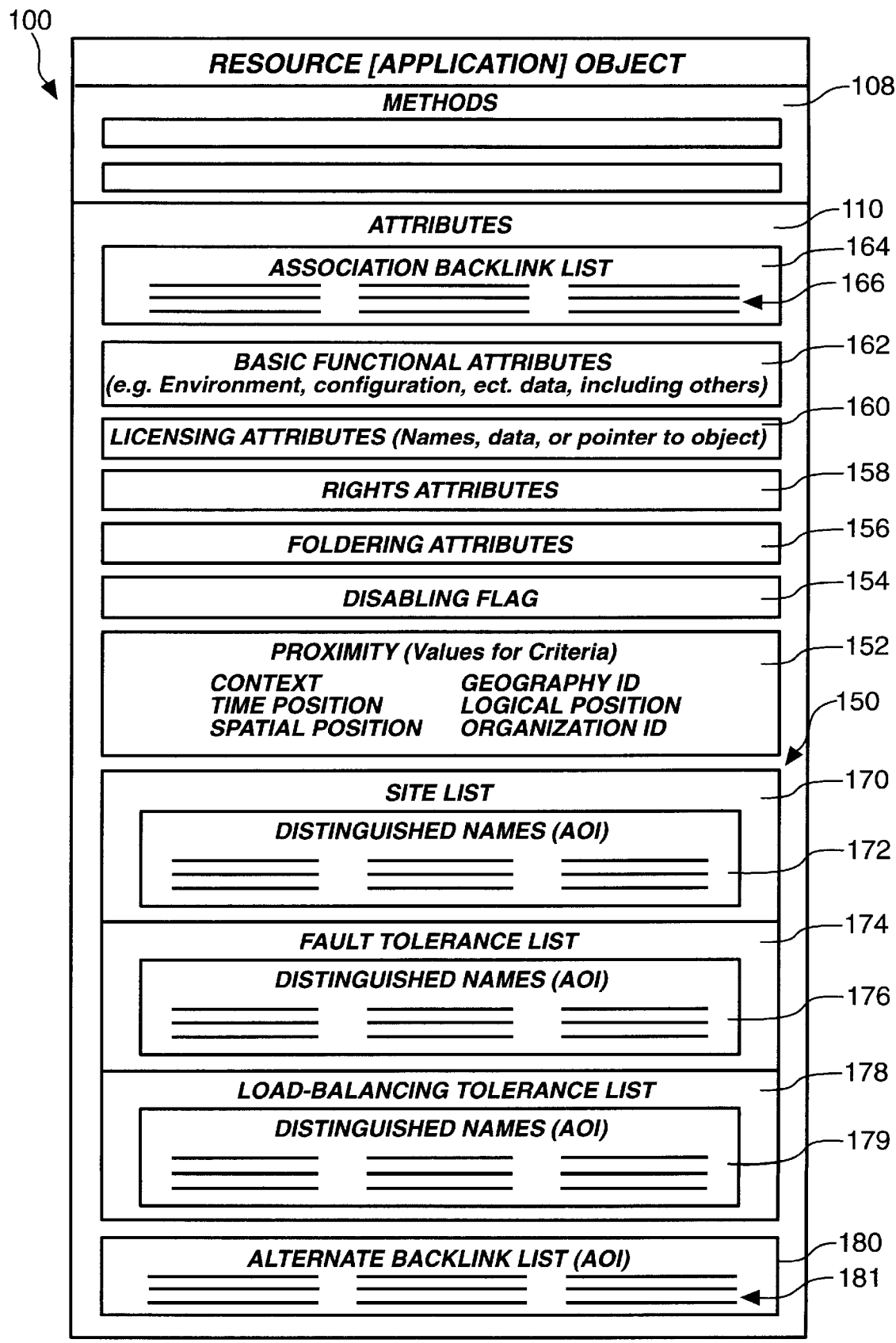
FIG. 7 is a schematic block diagram of an application object in accordance with the invention for inclusion in the directory services system of FIG. 3.

Referring to FIG. 7, a resource object 100, in accordance with the invention, may include methods 108 and attributes 110. In one presently preferred embodiment, reliability attributes 150 (alternatively referred to as redundancy attributes, hierarchy of redundancy, or instance relation attributes) may be added to an application object 100.

As an example of a readily understood resource object, an application object 100 may be discussed. Herein, for all appropriate features, an application object may be used to represent a generic resource object.

A proximity attribute 152 may provide values associated with the application object 100 for determining the proximity of the application object 100 and its associated resources to a particular hardware location or physical user. The proximity attribute 152 may reflect a measurement, context, a time position or time for access, spatial position, organizational identification, logical position, or geographical identifier for identifying a proximity of an application object 100 with respect to a coordinate system locating another object, such as a user object 98, group object 96, or container object 94.

A proximity attribute 152 may reflect any measurement criterion effective for determining relative ease of access by one object 92 to a particular application object 100. A disabling flag 154 may provide an ability to determine whether or not an application object 100 has been removed from access. Configuration of environments, rights, masks, associations, and the like may be relatively time consuming and burdensome to the system.

To manage such allocation of configuration information when an application object 100 is to be removed from service for a short period of time, such as during maintenance, may be a colossal waste of time. Thus, a disabling flag 154 may be set as an attribute to be read by any executable attempting to access the application object 100. A disabling flag 154 allows the application object 100 to exist, fully configured, and yet be inaccessible. Thus, any executable seeking to access an application object 100 may be referred to the redundancy attributes 150 in order to find an equivalent instance to be used in place of the application object 100.

A foldering attribute 156 may be provided to store information indexing the associations corresponding to an application object 100 and other objects 92 in a directory services database 90. Rights attributes 158 may contain any information associated with authorizations appropriate to access of or by an application object 100.

Similarly, licensing attributes 160 may identify authorizations, charges, and other administrative information required for licensing an application associated with an application object 100. As understood in directory services systems, an object 92 (e.g. application object 100) represents logically certain files of data or executables (e.g. an application), and each is often spoken of as the other, though they are not actually the same thing. In general, the attributes 150–160 are new specialized attributes associated with certain features corresponding to the inventions disclosed herein, and may be incorporated into the basic functional attributes 162 associated with application objects 100 in general.

Thus, in certain embodiments, basic functional attributes 162 may include environment information, configuration information, and other data. In other embodiments, the attributes 150–160 may be included in the basic functional attributes 162. Meanwhile, other functional attributes may be added for special functionality.

A key attribute 110 of a resource object 100, such as an application object 100, may be an association backlink list 164 containing distinguished names 166 of objects associated in some appropriate way with the resource object 100. The association backlink list 110 may be used for binding security, and management of access to the resource represented by the resource object 100.

The hierarchy 150 or redundancy attributes 150 may include a site list 170 of distinguished names 172, a fault-tolerance list 174 of distinguished names 176, a load-balancing list 178 of distinguished names 179, or all lists 170, 174, 178, where the distinguished names 172, 176. 179 represent alternative instances of application objects or application object instances (AOI). The distinguished names 172, 176, 179 may be relied upon when the application object 100 is unavailable for access.

All those certain preferred embodiments of an apparatus and method in accordance with the invention may use load-balancing, fault-tolerance, and remoteness of a user from a home network, to justify hierarchical reliance on the load-balancing list 178, fault-tolerance list 174, and site list 170, in that order, and the proximity value 152 may also be used for determining, in order and instance of an application object 100 to be accessed, based solely on the proximity attribute 152. For example, if the disabling flag 154 is set to make the application object 100 inaccessible, for any reason, the hierarchy 150 may be relied upon in conjunction with the proximity attribute 152 in order to find the "closest" available instance of the application object 100 for access.

An alternate backlink list 180 may include distinguished names 181 of objects 92 (e.g. application object instances equivalent application object 100) in which the application object 100 is identified by a respective redundancy attribute 150. Thus, the alternative backlink list 180 provides administrative information for cleaning up associations throughout a directory services object tree 90.

Figure 8:
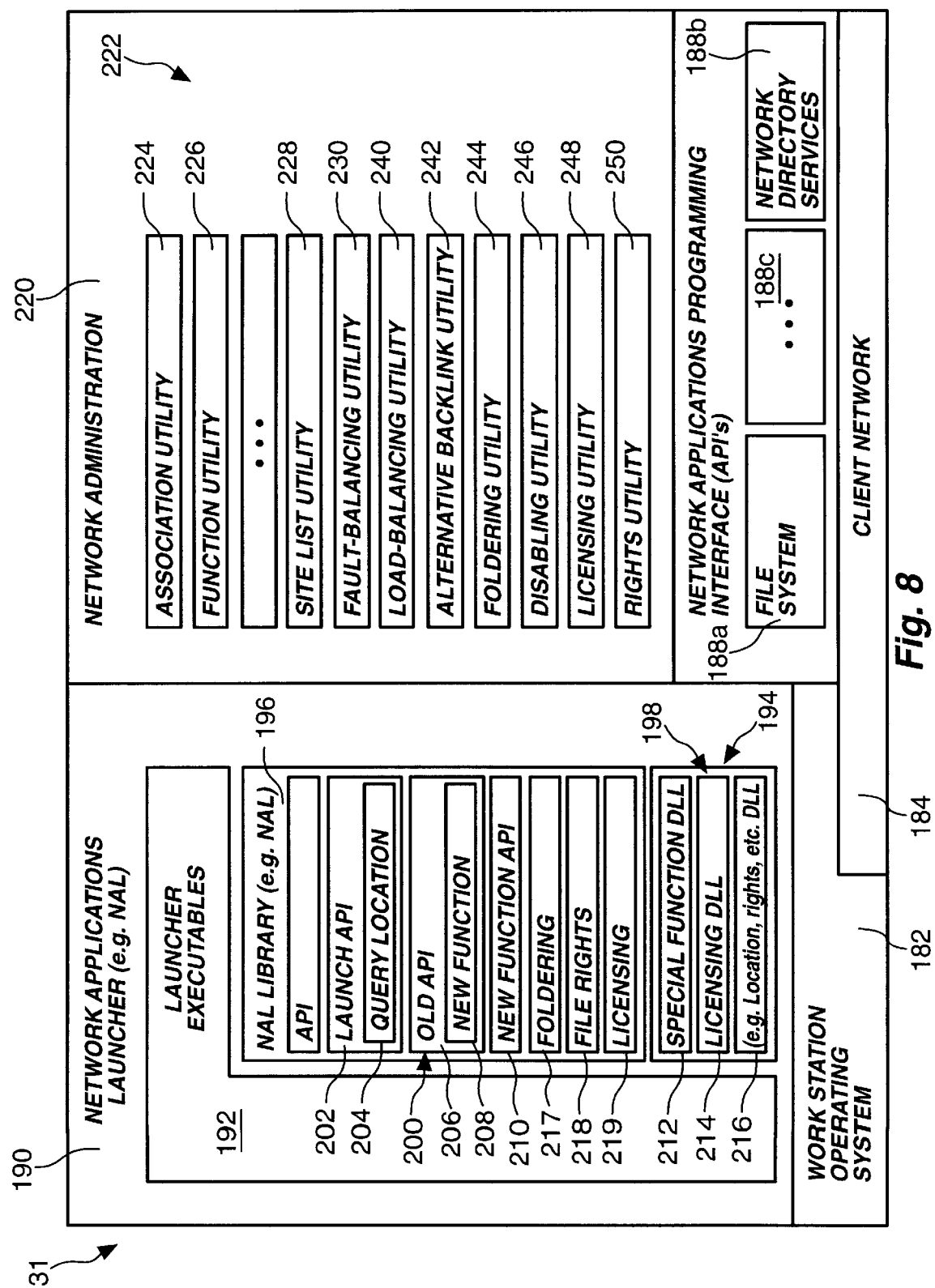
FIG. 8 is a schematic block diagram of a network application launcher system illustrating data structures for administrating and executing functions and data structures in accordance with the invention.

Referring to FIG. 8, a node 31 may contain executables in a storage device 34 for executing in a processor 32 (see FIG. 2) in accordance with the invention. An operating system 182 (workstation operating system 182) may interface with a client 184, alternatively called a client module or network client 184, connecting to a network 50. Network application programming interfaces (API's) 186 may include biosystem API's 188*a*, network directory services API's 188*b*, and other API's 188*c* interfacing directly with the client 184.

A network application launcher (NAL) 190, interfacing with the operating system 182 may include various launcher executables 192. Executables 192 may include single instructions, applications, libraries, functions, and the like, including specially programmed dynamically linked libraries (DLL) 194. For example, a NAL library 196 includes various API's 200 including a launch API 202, including a query 204 programmed to query an application object 100 for location data, such as proximity attributes 152. As a practical matter, the API's 200 may include adaptations of old, or less-conventional functions such as an old API 206, provided with a new function 208 for implementing the invention.

Alternatively, new functional API's 210 may be programmed for implementing certain embodiments of the invention. In yet another alternative, new DLL's 198 may be added, each DLL 198 being provided specifically for supporting a new special function in accordance with the invention. For example, a special function DLL 212 may be created for selecting a closest application object 100 to a user object 98 in a particular object tree 90.

Special function DLL's 212 may be created for providing fault-tolerance executables, load-balancing executables, and remote access executables for using (consuming) the attributes 150 of an application object 100. Thus, a special function DLL 212, or a new functional API 210, or simply a new function 208 in an old API 206 may contain the executables for consuming attributes 110 of an application object 100. In certain embodiments, a licensing DLL 214, a location DLL 216, for consuming the redundancy attributes 150, or a rights-management DLL for managing access rights, may all be included in a DLL 216 or individual DLL's 198.

The functionality of the DLL's 194 may be accomplished in several different ways. For example, in general, a network administration module 220 may contain utilities 222 for managing (creating, modifying, deleting, etc.) attributes 110 in an object 92, such as an application object 100. The DLL's 194 may be configured to consume (use, access, read, etc.) the attributes 110 managed by the utilities 222.

Figure 9:
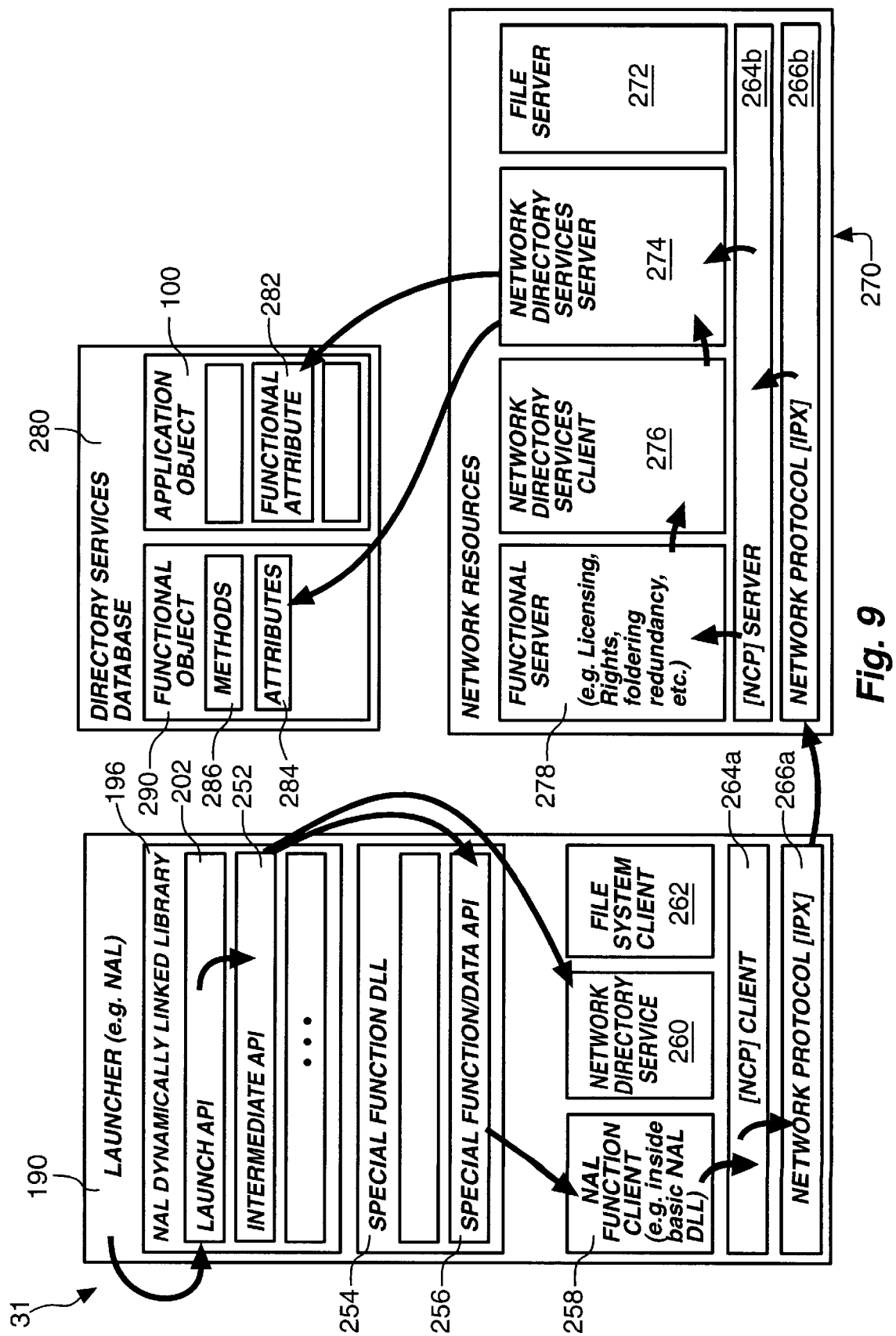
FIG. 9 is a schematic block diagram of data structures and operational access for one embodiment of an architecture for a network application launcher, such as that of FIG. 8.

However, a simple executable such as a new function 208 adapted to implement a feature of the instant invention may completely satisfy any functional need and use of an attribute 110. Alternatively, a new functional API 210 may be programmed to access or use an attribute 110. Alternatively, a new function 208, or new API 210, may provide indirection by calling another DLL 198 (e.g. 212, 214, 216) or APIs 200 to perform or supervise a desired function. FIG. 9 further elaborates on methods and data structures for these different approaches.

The utilities 222 are also referred to as snap-ins 222, and are each associated with some specialized functional ability. Thus, in general, an association utility may manage an association list 164 in application object 100. Other functional utilities 226 may be created for any particular need. Specific needs identified for embodiments for the instant invention may include a site list utility 228 for managing distinguished names 172 in the site list 170, a fault-tolerance utility 230 for managing the distinguished names 176 in the fault-tolerance list 174, a load-balancing utility 232 for managing the distinguished names 179 in the load-balancing list 178, an alternate backlink 234 for managing the contents of the alternate backlink list 180, a foldering utility 236 for managing the foldering attributes 156, a disabling flag utility 238 for managing the disabling flag 154, a licensing utility 240 for managing the licensing attributes 160, and a rights utility 242 for managing a rights attributes 158.

In general, an object 92 (e.g. application object 100) has attributes 110 and may have methods 108 for using certain of the attributes 110. A network administration module 220 manages the attributes 110 through the snap-ins 222 (utilities) in order that those attributes 110 will be available for use by API's 200 in the network application launcher 190.

Utilities 222 may be highly distinctive, or integrate many functionalities into a single utility. The architecture choice is largely available to a developer in order to provide the most robust and adaptable system. For example, in one presently preferred embodiment, the network application launcher 190 includes a query location executable 204 in the launch API 202 of the NAL library 196. The location of an application object 100 is identified thereby. Location may actually be defined and queried by any suitable rule.

In certain embodiments, location may be an identification by server, by actual spatial global positioning systems, by network directory services hierarchical position within a tree 90, by geographical location name, by context, by path, by any of the values of the proximity attribute 152, by routing speed between locations, by global addressing scheme, DHCP protocol, or the like. The query 204 may eventually access the redundancy attributes 150 and the proximity attributes 152 to resolve the query 204, select an application object instance, and complete the launch thereof.

Referring to FIG. 9, and certain features of FIGS. 2–8, a node 31 may host a launcher 190 relying on a dynamically linked library 196 of API's 200, such as a launch API 202 and intermediate API's 252 access thereby. In addition, special function DLL 254 including special function 256 operating as NAL function clients 258 with the network operating system clients 264 and network protocol 266 may access network resources 270. A file server 272, network directory services server 274, and specialized, functional servers 278 may operate as resources 270. The network resources 270, may access a directory services database 280 (via clients 276 to server 274), such as the object trees 90 (see FIG. 3) to access application objects 100, in order to provide the functional attributes 282 needed by the API's 256, 252, 202 to operate. In certain embodiments necessary attributes 284 may be provided along with methods 286, or alone, in specialized, functional objects 290 adapted to specific functions or purposes.

Referring to FIG. 9, a node 31 hosting a launcher 190 (NAL 190) relying on a NAL library 196 including a launch API 202 may call, or include, or otherwise engage, an intermediate API 252. In one embodiment, the calling API 252 may call, relying on indirection, a special function dynamically linked library 254 to access a special function API 256 adapted to the requested function, such as one of those associated with the attributes 110 of FIG. 7, DLL 194 of FIG. 8, and snap-ins 222 of FIG. 8.

The special function API 256 may also be thought of as a NAL client 258 or a NAL function client 258 for accomplishing a desired function. The client 258 may then access through the network client 264 a (e.g. for example, a netware core protocol) through a network protocol 266a client module (e.g. IP, IPX, etc.) to the server portion of the network protocol 266b and network server module 264b to access a functional server 278.

A functional server 278 may be dedicated to a particular function, such as the licensing, rights management, redundancy provision, or the like, in accordance with the attributes 110 and API's 200 of FIGS. 7–8. Thus, the server 278 may access a network directory services client module 276 contacting the directory services server 274 to provide access to a functional object 290 adapted to the desired function, and containing the attributes 84, methods 286, or both for accomplishing the function.

Alternatively, the launcher 190 may call the launch API 202 which, after engaging the intermediate API 252, may engage a network directory services client module 260. The client 260 may then access through the client 264a, protocol 266a, protocol 266b, and server module (interface 264b), the network directory services server 274. In this embodiment, the network directory services server 274, (server 274) may then access directly a functional attribute 282, such as any of the attributes 110 of the application object 100. Thus, in this embodiment, a calling API 252 may actually consume the attribute 110 provided in accordance with the invention implementing benefits of any particular function of the invention.

In one embodiment, a single attribute 110 may be used, in alternative embodiments, any number of the attributes 110 may be used in an application object 100, or a specialized functional object 290 program for a specific purpose. For example, a licensing object 290 may be provided, or a rights management object 290, or the like.

Thus, when a launcher 190 accesses a launch API 202, the launch API 202 may perform alone or may rely on an intermediate API 252 directly or using further in direction. The intermediate API 252 may be configured for to executing specialized function directly. Alternatively, the intermediate API 252 may engage the client 258 to obtain access to a specialized, functional object 290 for executing the desired functional features.

In yet another, third, embodiment, the intermediate API may access a network directory services client 260 in order to obtain functional attributes 282 directly from a directory services database 280 in an application object 100. Thus, high levels of sophistication may be provided in the methods 286 and attributes 284, or function attributes 282 may be accessed directly for use in API's 200, such as the API's 252, 256 programmed to provide any required skills.

In a simple, but less flexible, approach, an intermediate API 252 may have a desired executable embedded therein, or in the launch API 202 itself may have any functional executables embedded therein. Thus, programming may be simplified but rigid, or flexible, but more complex, by any of the above mechanisms. The functional features of providing associations, the remote accessed at distance sites from a home network, providing fault-tolerance access to alternative objects 92, 100, load-balancing by accessing alternative servers 14, backlinking, foldering of application objects 100 or other objects 92 to be displayed, viewed, and managed in some logical hierarchy, disabling an object 92, particularly an application object 100, without having to remove and restore configuration, licensing, and rights management, may all be provided by individual combinations of attributes 110 managed by snap-ins 222 and consumed by API's 200 in the network application launcher 190.

Figure 10:
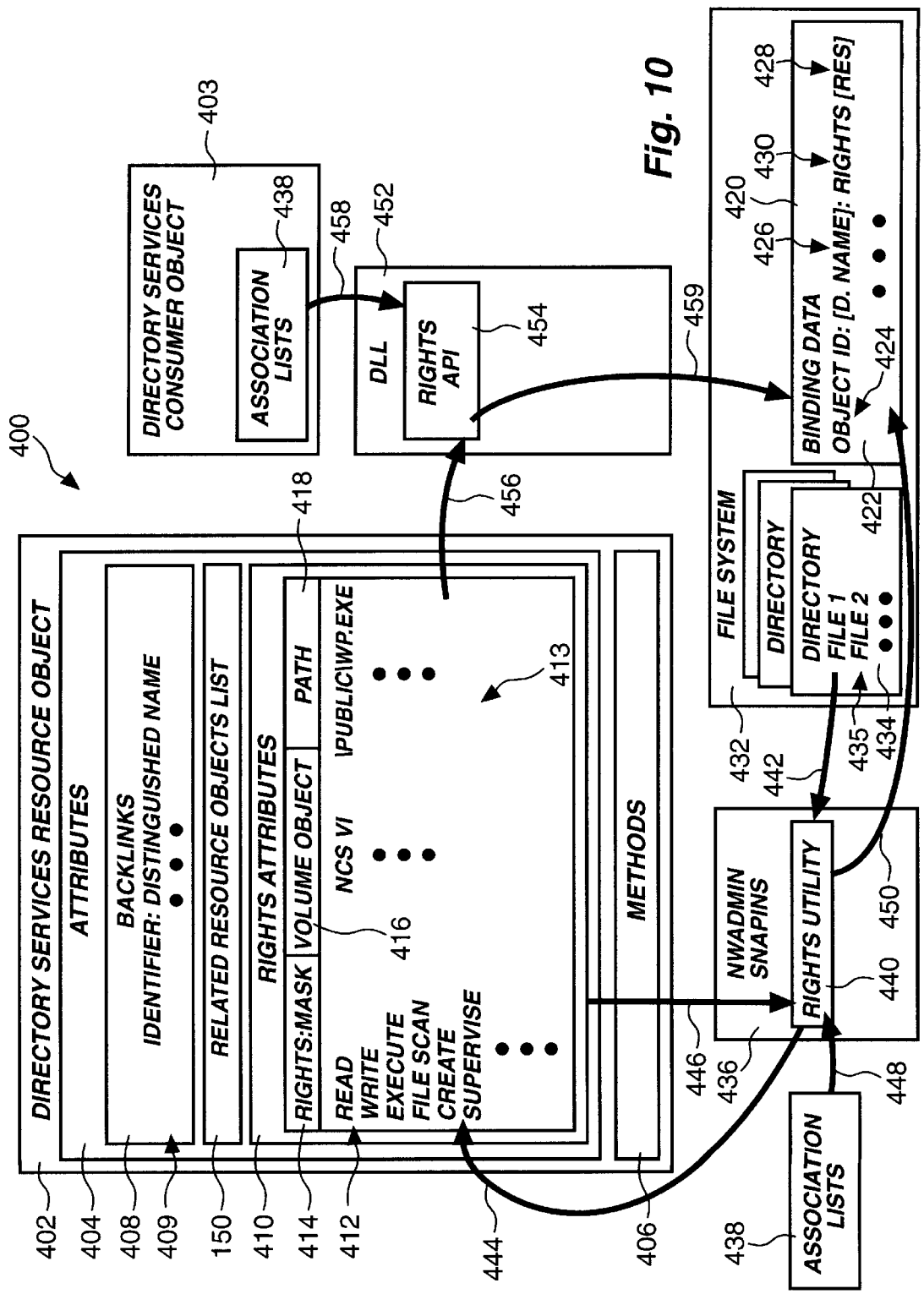
FIG. 10 is a schematic block diagram of data structures suitable for implementing a dynamic rights assignment system in accordance with the invention, which may use the directory services system of FIG. 3, in conjunction with the data structures and architecture of FIGS. 2–9.

Referring to FIG. 10, a rights management system 400 is illustrated. The system 400 may include a directory services resource object 402, corresponding to a resource, from a directory services system 80 (see FIG. 3). A consumer object 403 may be a user 98, group 96, container 94, or the like, using the resource. The directory services resource object 402 may include attributes 404 known in the art, or previously available to directory services objects 92 in general. Attributes 404 may be used in conjunction with methods 406, although methods 406 may not be required for all embodiments of a rights management system 400.

Among the attributes 404 may be included backlinks 408. The backlinks may comprise certain identifiers 409 such as a distinguished name of a consumer object 92 associated with, and needing access to the resource object 402.

Attributes 404 may include rights attributes 410. Among the rights attributes 410 may be numerous entries 412 corresponding to specific functionality that a consumer object 403 may require access to. For example, the ability to read, right, execute or merely scan a file may be separately assigned. Meanwhile, the ability to create or save, or supervise files, directories of files, or the like may be assignable. As a practical matter, files may be defined broadly enough to include all executables and data of all types in a network 30, 50.

Thus, rights 414 provided by the entries 412 of a multi-valued rights attribute 410 (alternatively referred to as rights attributes, plural) may be linked directly to one of a selected server's particular volume objects 416 or similar demarcation of a physical or logical site to be accessed. In one embodiment, a path 418 identifying the context and name of a resource or a file associated therewith may be linked in the rights attributes 410 as part of an individual entry 412. One may think of the volume object 416 and local path 418 together as a total path 418 identifying a file to which rights 414 are needed.

In one embodiment, binding data 420 may be produced using the rights attributes 410. For example, individual entries 422 may identify a consumer object 403, or a resource object 402 and rights associated therewith. In one presently preferred embodiment, binding data 420 may simple include a series of entries 422 forming a table 420 linking an object identifier 424 corresponding to the consumer object 403 with rights 414 to a file (e.g. file 418, defined by path 418). In one embodiment, a distinguished name 426 may be included. The distinguished name 426 may be that of the resource object 402, access to which is being granted, or the distinguished name 426 of a directory services consumer object 403 which consumer object 403 is receiving the right of access. In one embodiment, the distinguished names 426 may involve both. In one presently preferred embodiment, no distinguished name 426 is required, and a directory services distinguished name is the consumer object identifier 424 corresponding to the consumer object 402.

In one embodiment, the object identifier 422 corresponds to a consumer object 403 receiving the right of access, and the object identifier 424 is a simple number for simple computational processing. Meanwhile, the rights 430 may include the identification of a resource identifier 428 separately, or embodied in some data identified therein simply as rights 430. The tradeoff between efficiency, simplicity, speed, storage, and processing time may all be traded off in determining what binding data 420 is suitable to save. In one currently preferred embodiment, any object identifier 422 corresponding to a consumer object 403 may be bound to a string, field, or the like identifying rights 430 and a corresponding file 418.

In general, the binding data 420 is contained in a file system 432. Each computer network 30, 50, 70 typically contains servers 74 having file systems 432 associated therewith. Any rights 430, 414 may be identified with one or more directories 434 or files 435. As a practical matter, the file system 432 manages and organizes files 435 in general, and particularly the directories 434 and files 435 as well as information regarding access to files.

Directory services objects 92 may contain association lists 110, 438. As a practical matter, consumer objects 403 and resource objects 402 may contain association lists 110, 438 identifying other directory services objects 92 associated therewith. In one embodiment, the association lists 438 corresponding to selected resource objects 402 may contain related resource object lists 150 (see FIGS. 7, 10) for providing data to a rights utility 440. In one embodiment, the rights utility 440 may be designed as one of several snap-ins 436 in the network administration module 220 (see FIG. 8 module 220 and snap-ins 222).

In one embodiment of an apparatus and method in accordance with the invention, a directory 434 or file 435 may be browsed in order to provide information concerning needs for desired rights 414, 430 to be assigned to a particular consumer object 403 with respect to a directory services resource object 402. The rights utility 440 may browse in order to write 444 (or process, or otherwise provide) the values 413 of entries 412 of the rights attributes 410.

As a practical matter, the rights utility 440 may also be tasked with reading 446, or otherwise using 446, the rights attributes 410 and reading or otherwise obtaining the information in association lists 438 in related resource objects 92,402 and consumer objects 403. Thus, the rights utility 440 may then process the rights attributes 410 and the association lists 438 in order to provide 450 binding data 420.

The rights utility 440 may be thought of as a manager or processor for maintaining rights attributes 410, using data 416, 418 identifying directories 434 and files with rights 414. It is also a maintenance executable 440 for using the rights attributes 410 in conjunction with association lists 438 to create and maintain binding data 420 in the file system 432. It links file rights 414 to files 418, 435 to consumer objects 403. Thus, in one respect, the rights utility 440 may be thought of as a manager 440 of attributes 410 as well as a consumer 440 of attributes 410 and manager of files system linking data 420.

In one embodiment, a rights API 454 may be the ultimate consumer of the rights attributes 410. As discussed with FIG. 9, a snap-in 22, network loadable module (e.g. NLM) or other executable may also perform that function. For example, any of the entries 412 may be provided 456 or read 456 to the rights API 454. The rights 450, or equivalent, API may then also read an association list 150, 408 in the directory services resource object 402 in order to create 459 or otherwise provide 459 binding data 420 for the file system 432.

Thus, in one presently preferred embodiment, the rights utility 440 may simply read the rights attributes 410 and the data contained in association lists 150, 408 in order to provide 450 certain information regarding the resource object 402. For example, providing 450 file 418 and rights 414 data into a table storing binding data 420, may initially be done. Meanwhile, other data may be provided 459 by the rights API 454 acting as the consumer 454 of the rights attributes 410 and association lists 150, 408 to fully authorize and create the binding data 420. Alternatively the executables 451, 454 may simply process any needed attributes 404 (e.g. rights attributes 410 and association lists 150, 408 dynamically at run time to add entries 422. Alternatively the rights utility may create the entire binding table 420 upon association of the objects 402, 403.

In one presently preferred embodiment, the rights utility 440 may be tasked only with the maintenance of the rights attributes 410. Thus, the rights utility 440 may be prohibited from creating 456 from the rights 430 the binding data 420. Instead, the rights API 454 may consume 456 the rights attributes 410 and provide the binding data 420. Thus, the rights utility 440 may be the maintenance engine for the rights attributes 410 of a directory services resource object 402, while a rights API 454 in a dynamic link library 452 (or an equivalent executable) such as that of the launcher 190 (see FIG. 8), operating in any of the ways described in FIG. 9, may be the only consumer 454 of the rights attributes 410 in creating the binding data 420. Thus, the tasks of maintenance or management 444 of the rights attributes 410 and the consumption 456 thereof or processing 456 thereof may be completely combined or divided between different respective executables 440, 454. Thus, in one presently preferred embodiment, snap-ins 222 (e.g. 224; 250, 440) may manage the attributes 404 (e.g. 408, 409; 410). The linking of binding data portions 424, 426, 428 430 into entries 422 may be done by a snap-in 250, 440, API 454, NLM or the like, early, late, statically, or dynamically.

Figure 11:
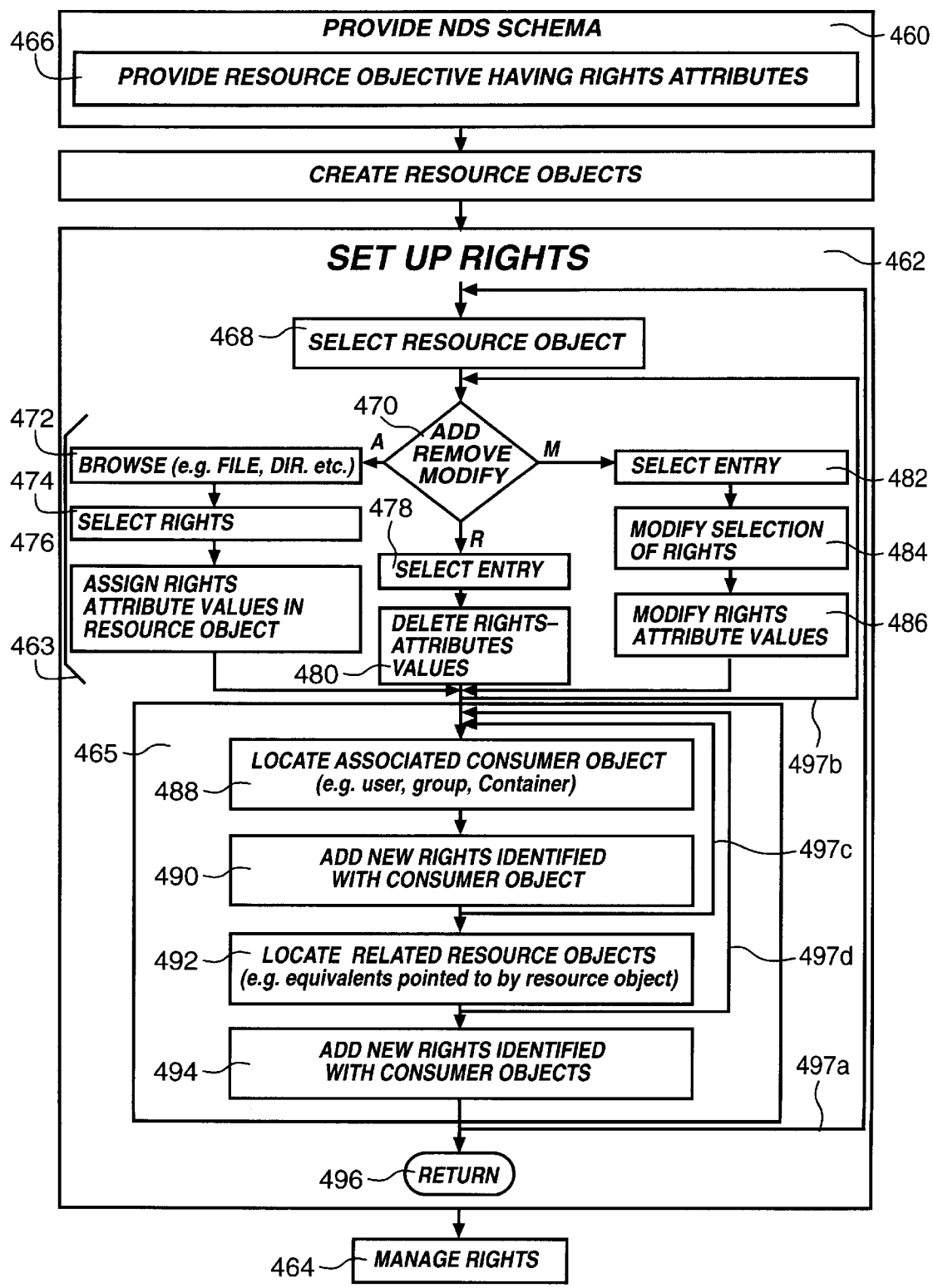
FIG. 11 is a schematic block diagram of methods for implementing one embodiment of the functions and data structures of FIG. 11 in accordance with the invention.

Referring to FIG. 11, a provide step 460 may provide an alteration to the schema of a directory services system 80 (refer to FIG. 3) defining a resource object 402. A create step 461 may then create instances 402. A setup step 462 may then set up the specific rights attributes 410 for directory services resource objects 402 defined in the schema, and supported thereby. An entry process 463 and extension process 465 may be included. A manage step 464 may then be tasked with actually managing the creation of binding data 420 according to the ongoing need for adding, removing, and altering rights attributes 410 in resource objects 402 in accordance with associations of the resource object 402. Actually the extension process 465 may be deleted, delayed, partially completed, or included in either the setup step 462 or manage step 464. The extension step 465 may be done by the snap-in 440, API 454, etc. early or late, at association or at run time, as can step 464.

Referring still to FIG. 11, one embodiment of a method and process for implementing the rights management system 400 of FIG. 10 is illustrated. Initially, a provide step 460 may provide a network directory services system schema. In addition to the typical tasks of a directory services system 80, and particularly to the supporting executables 104 thereof (see FIG. 3), a provide step 466 may provide a resource object 402 in the directory services system 80 having rights attributes 410. The provide step 460 may require alteration of the schema of the directory services system 80, as well as subsequent creation 461 or instantiation 461 of resource objects 402 in accordance with the schema. A setup step 462 may then be used to set up the rights 410 and the rights values 412 of the individual entries 412 in the multi-valued rights attributes 410. Thereafter, a manage step 464 may be used to manage the rights attributes 410 and more generally the assignment of rights 430 to the files 435.

The setup step 462 may include a select step 468. The select step may have the functional responsibility for selecting a specific resource object 402 in which values 413 to whose rights attributes 410 are to be selected, populated, or created. Note that the rights attributes 410 pertain to the resource object 402 and may be contained as part of the general attributes 404 thereof. Nevertheless, in certain embodiments, a specific resource object 402 may contain nothing but rights attributes 410, effectively, and thus be a special purpose resource object 402 created for the specific purpose of granting, removing, or otherwise managing rights attributes 410.

Following the select step 468, a test 470 determines whether rights are to be added, removed, or modified in the resource object 402 that has been selected 468. If the test 470 determines that rights 414 are to be added, the browse step 472 permits a network administrator to browse files 435, directories 434, and the like, to find necessary files 435 in the file system 432.

A select step 474 then provides a selection of rights 414. After the select step 474, an assign step 476 may assign rights attribute values 413 as entries 412 in the rights attributes 410 of the directory services resource object 402. Each entry 412 may link a right 414 or rights 414 with a file 435 addressed by a path 418 and server volume 416, or the like.

If the test 470 determines that rights are to be removed, a select step 478 may select an entry 412 in the rights attributes 410 for deletion. A delete step 480 may then delete the entry 412, or values 413 in the rights attribute 410. As a practical matter, whether the rights attributes 410 are treated in tabular form, wherein individual entries 412 are added and deleted, or simply as links that are made and unmade, need not be critical. Nevertheless, in one presently preferred embodiment, an entire entry 412 may be removed by the delete step 412.

If the test 470 determines that rights attributes 410 are to be modified, a select step 482 may select an individual entry 412. The modify step 484 may then modify the values in the entry 412, or modify entire entries 412. Thus, the selection of rights 414 may be made independently from the actual attribute values 413 that may be stored in the rights attributes 410 in any specific data structure. Thus, a modify step 486 may modify the values of rights attributes 414, while a modify step 484 may modify a selection of rights permitted. Alternatively, the modify steps 484, 486 may selectively engage the steps 472–476 and the step 478-480 as an administrator so wills.

Whether the decision 470 results in adding, deleting, or modifying rights attributes 410, the extension step 465, including one or more iterations through a locate step 488, an add step 490, a locate step 492, and other add steps 494, may be executed after or prior to a return 496, as mentioned above. The locate step 488 may locate a consumer object 403 such as a user object 98, group object 96, or container object 94, that is to be granted rights 414 to a resource object 402. The extension of step 405, particularly the locate step 488 and the locate step 492, may rely on the association lists 408, 150, respectively, in the resource object 402 to identify backlinks 409 and equivalent resources 402, 100, 92, respectively. Meanwhile, the add step 490, 494 may add new entries 412 to the rights attributes 410 for all files 435 (e.g. 416:418) and rights 414 identified or to be identified with the selected resource object 402.

As a practical matter, the locate step 492 is important in that a network directory services system 80 typically replicates various resource objects 402 throughout a network 30, 50. As discussed with respect to FIG. 7, redundancy attributes 150 identify these equivalent resources. Accordingly, different instances of basically equivalent resource objects 402 may exist in various locations (e.g. nodes 72, servers 74, etc.) in order to be available to different entities associated with various consumer objects 403. Accordingly, the locate step 492 may locate related resource objects 402, such as other objects 92 in an object tree 90 of a directory services system 80 that are pointed to by the original resource object 402 to which such remote objects 92 are functionally identical or otherwise equivalent. Thus, the locate step 492 may rely on association lists where other attributes 410 of any resource object 402 in order to locate equivalent resource objects 92.

The add step 494 may add new values 413 by means of individual entries 412, typically, that are to be identified later (e.g. in binding data 420) with any consumer objects 403 deemed to require rights 414 to the resource object 402, its files 435 (e.g. 416:418) and its equivalents. Thus, the add step 494 may rely on other association lists 150 that are contained within the attributes 404 of the resource object 402. Note that the repeats 497a, 497b, 497c, 497d allow any locate 486, 494 or add 490, 494, or the entire step 463 or extension step 465 to be repeated as needed. The extension 465 may identify other container objects 94, group objects 96, user objects 98, and the like that may also need, deserve, or otherwise addition of the rights 414 granted to the original directory services consumer object 403 with respect to any of the equivalents of the resource objects 402.

Referring still to FIG. 11, in view of FIG. 10 adapted to the system of FIGS. 1–9, the locate step 488 may rely on an association list 408. Thus, although not repeated in FIG. 10, a directory services resource object 402 may be configured to have one or more of the attributes 110 of the resource object 100 of FIG. 7 including backlinks 164, 408. Accordingly, an association list 164 may be used to identify any of the consumer objects 403, 94, 96, 98 to which the resource object 402 is associate. An association list 164, alternatively referred to as an association backlink list 408, identifies specific consumer objects 403, 92, 94, 98 in whose association lists 438, the resource object 402 is identified.

The rights API 454 may obtain 458 information from association lists 438, along with obtaining 456 rights information from the rights attributes 410 of the resource object 402, in order to verify whether rights 414 may properly be removed. Accordingly, the locate step 488 may include location of consumer objects 403 identified in an association list 164 pertaining to the resource object 402 or its equivalents.

Meanwhile, any rights 414 identified with consumer objects 403 already associated with the resource object 402 by means of the association list 164, at the time of execution of the setup step 402, may be added 490 to the binding data 420. In certain embodiments, replications or equivalent instances of objects 402, 403 may be distributed throughout a directory services system 80. Upon obtaining 458 the information in an association list 438 of a consumer object 403, a snap-in 440 or rights API 454 may obtain pointers to additional resource objects 402 backlined 408 to more consumer objects 403, 94, 96, 98. Thus, the locate step 488 may rely on both the attributes 404 of the resource object 402 as well as the attributes 110 of consumer objects 403 in order to locate 488 all important associations.

Thus, after adding 490 rights 430 to the binding data 420, as identified with the consumer object 403, the resource object 402 may optionally be investigated further. A locate step 492 may locate 492 within the attributes 404 of the resource object 402, an association list 150 identifying replications or other equivalent instances of the resource object 402. For example, an association list 110 may include distinguished names 124, 165 or other identifiers corresponding to resource objects 100 that may be equivalent to the resource object 402. The locate step 492 may be executed using an association list 110, 150 of the resource object 402 as pointers. Rights attributes 410 associated with those replications or equivalents 100, 402 may then be added 494 to the binding data 420 as additional rights 430.

Figure 12:
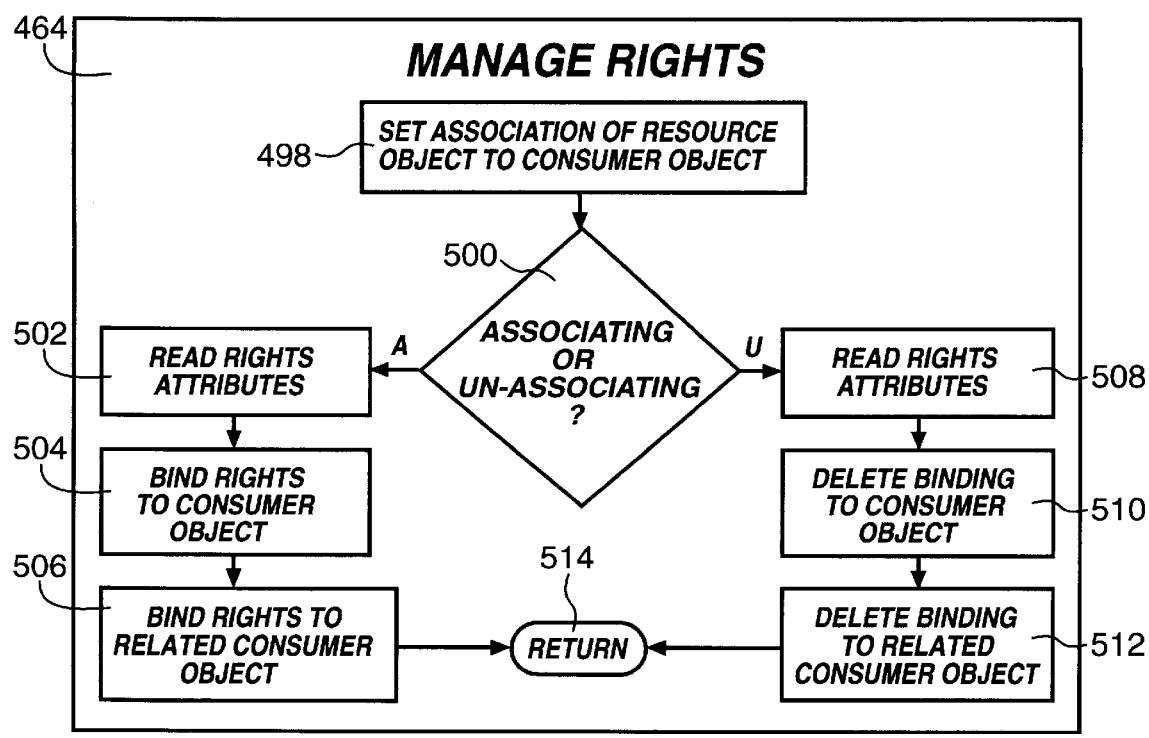
FIG. 12 is a schematic block diagram of one embodiment of detailed steps in the method of FIG. 11.

Referring to FIG. 12, in view of FIGS. 10 and 11, for a system as described in FIGS. 1–9, a manage step 464 may complete functional responsibility for managing actual values of the entries 412 of the rights attributes 410 in future associations or dissociations. The manage step 464 may initially include a set step 498. The set step 498 may set or otherwise establish an association of a resource object 402 to a consumer object 403. As a practical matter, an entry in an association list 110, 408 of a resource object 100, 402 may be created or deleted, corresponding to a consumer object 403.

Similarly, the set step 498 may create or delete an entry 409 in a back link 164, 408 of a resource object 402. Actually, a back link 409 may be thought of, in one embodiment, generically, as an entry 166 in an association list 164 of a resource object 100 in general. Thus, the set step 498 may be completed by the rights utility 440, API 454, association utility 224, an NLM, or the other directory services supporting executables 104, in the course of managing the associations between related objects 92, in general.

In one presently preferred embodiment, the set step 498 may include either associating or un-associating (dissociating) two directory services object 92. For security, efficiency, and robust operation, as well as to minimize processing time and storage space in a memory device 34, the set step 498 typically operates on attributes 110 of resource objects 100, 402 and attributes 110 of consumer objects 94, 96, 98, 403. The set step 498 operates in either direction to associate or un-associate by adding, deleting, or editing entries in the appropriate association lists 110, 114, 122, 118, 150, 408, 438, and the like.

Following the set step 498, a test 500 may determine whether the set step 498 was associating or un-associating objects 92 (e.g. consumer objects 403 and resource objects 402). If the test 500 identifies that association was being effected, the read step 502 reads rights attributes 410. More particularly, the read step 502 will read values 413 of the rights 414 represented by the individual entries 412 of the resource object 402. As a practical matter, the setup step 462 of FIG. 11 may be tasked with setting up the rights attribute 410 in terms of rights 414 that may be available for previous associations with a resource object 402 and completes a binding equivalent to that of the step 464. The manage step 464, may be more particularly directed to providing the binding data 420 in the file system 432, as a result of ongoing changes in associating the directory services consumer objects 403 with the directory services resource objects 402.

The read step 502 may correspond directly or indirectly to the provide step 456 by which the rights API 545 obtains the values 413 of the appropriate rights attributes 410. The rights API 545 may also obtain the name of the consumer object 403 in order to provide the object identification 424 to be bound to the rights 430 obtained from the rights attributes values 413. Thus, an individual entry 422 in the binding data 420 may contain any appropriate information and format to indicate the nature of the rights 430, the resource 428 (e.g. resource object 402), and the like associated with a particular consumer object 403 identified by some identifier 424. The identifier 424 as described above may be the actual distinguished name 426, optionally, corresponding to the consumer object 403. In other embodiments, the identifier 424 may effectively be a brief number well adapted to rapid processing by a processor 32.

The bind step 504 may be executed by the rights API 454 to create one or more entries 422 in the binding data 420 of the file system 432. In directory services systems 80, generally, a particular consumer object 403 such as a group object 96, for example, may have many other names 142 of related objects 92. Accordingly, the bind step 506 retrieves 458 from association lists 438 of a consumer object 403 and any related consumer objects 92, 94, 96, 98 the names 142 or other identifiers to be used as additional consumer object identifiers 424 in additional entries 422 in the binding data 420. Accordingly, at the completion of the bind step 506, the rights attribute 410 required by all related consumer objects 403 (e.g. 92, 94, 96, 98, etc.) are represented by entries 422 in the binding data 420, properly bound to the appropriate and corresponding rights 430. In passing, one may note that the distinguished name 426 is optional as a substitute for the object identifier 424, or in addition thereto. Questions of efficiency and storage availability may dictate such as decision. Similarly, the format of the rights 430 and the manner in which the resource 428 is identified therein, is also a matter of design choice in architecture in order to optimize processing speed and storage space.

If the test 500 determines that un-associating has occurred in the set step 498, binding data 420 includes entries 422 that need to be disabled or removed. In some embodiments, entries 422 may be edited within their incorporated details. For example, rights 430 may be altered. Rights 430 may be replicated. An entry 422 or the rights 430 therein, may simply be disabled by a disabling flag incorporated into the entry 422 or elsewhere. Nevertheless, in one currently preferred embodiment, entries 422 may simply be created or deleted with association or un-association of objects 92. Since the rights attributes 410 remain in the resource object 402 involved in any entry 442, addition and deletion of entries 422 may be done relatively rapidly by the rights API 454 executing the manage step 464.

Upon un-associating a resource object 402 from a consumer object 403 in the set association step 498, the rights API 454 may execute a read step 508. The read step 508 may read rights attributes 410 from a resource object 402 that is dissociated from a formerly associated consumer object 403. In one embodiment, the read step 508 may read the rights 430 from an entry 422. For example, since the rights 430 typically contain, either explicitly or implicitly in the nature of the data structure storing the binding data 420, the identification of a resource 428 to which the rights 430 pertain. Thus, an entry 422 or numerous entries 422 may be searched to identify the object identifier 424 corresponding to an un-associated consumer object 403, and the resource 428 corresponding to the newly un-associated resource object 402. By either mode, the read step 508 may be performed by the rights API 454 to determine entries 422 that must be altered, or deleted.

The delete step 510 follows the read step 508, and may be executed by the rights API 454 removing an obsolete entry 422. Likewise, related consumer objects 92, 94, 96, 98, 403 were typically represented by entries 422 in the binding data 420. The entries 422 may contain pointers to other entries 422 of related object identifiers 422. Alternatively, the rights API 454 may again read association lists 438 to determine currently related consumer objects 403. Thus, the delete step 512 may include a search and identification of related entries 422, followed serially by deletion. One advantage to returning to the association lists 438 in the delete step 512 is the currency of association lists 438, as maintained by the directory services system 80. However, the entries 422 also need to be reviewed for their currency. If the manage process 464 or manage procedure, step, method, etc. 464 is consistently followed, the choice of relying on association lists 438 or data contained within individual entries 422 for the delete step 512 should achieve the same result. Thus, efficiency in processing and storage of data may be used to determine what information is to be stored in what locations and how it is to be retrieved. As a practical matter, the data structures of FIG. 10 illustrate the nature and relationships of the executables and operational data effectively used in one presently preferred embodiment to effect the process of FIGS. 11–12.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for dynamically managing file rights using a directory services system, the apparatus comprising:
   a network comprising interconnected computers;
   a processor in the network for executing executable data structures;
   a memory device operably connected to the processor for storing the executable data structures and operational data structures associated therewith, the executable and operational data structures comprising:
      a directory services system for storing and managing directory services objects and relationships there between;
      a resource object, of the directory services objects, corresponding to a resource selectively available over the network in accordance with file rights;
      the resource object, further comprising a rights attribute for defining selected file rights associated with the resource and selected from the file rights; and
      a consumer object, of the directory services objects, corresponding to an entity for using the resource in accordance with the selected file rights.

2. The apparatus of claim 1, wherein the executable data structures further comprise a rights executable programmed to use the rights attribute to link the selected file rights to the consumer object.

3. The apparatus of claim 2, wherein the rights executable is contained in a dynamic link library.

4. The apparatus of claim 2, wherein the rights executable is an application programming interface associated with a launcher for launching the resource.

5. The apparatus of claim 1, wherein the executable data structures further comprise a rights utility for managing a value of the rights attribute.

6. The apparatus of claim 5, wherein the rights utility is comprised within a network administration module.

7. The apparatus of claim 6, wherein the rights utility is a snap-in module.

8. The apparatus of claim 1, wherein the operational data structures further comprise binding data linking the consumer object to the selected file rights with respect to the resource.

9. The apparatus of claim 1, wherein the executable and operational data structures further comprise a consuming executable, executable by the processor and effective use the selected file rights to link the resource object to the consumer object, and to convey to the consumer object the selected rights.

10. The apparatus of claim 1, wherein the resource is an application.

11. An apparatus for managing file rights in a computer network having at least one processor and a memory device operably connected thereto for storing executable data structures and operational data structures associated therewith, the executable and operational data structures comprising:
   a directory services system storing and managing resource objects, consumer objects, and links there between;
   a plurality resource objects, each corresponding to a resource providing a function to nodes connected to the network;
   a resource object of the plurality of resource objects, comprising a file rights attribute;
   a consumer object of the consumer objects in the directory services system;
   a rights utility, executable by the processor to manage the values of the rights attributes to reflect access rights available with respect to the resource corresponding to the resource object; and
   a consuming executable, executable to use the rights attribute to link the consumer object to the resource object and to provide the access rights thereto for the consumer object.

12. A method for managing file rights over a network, the method comprising:
   providing a directory services system for managing and relating objects;
   providing, in the directory services system, a resource object corresponding to a resource available over the network;
   providing, in the directory services system, a consumer object corresponding to a node in the network for using the resource; and
   providing a rights attribute in the resource object for defining rights available in association with the resource.

13. The method of claim 12, further comprising:
   selecting the resource object;

selecting file rights to be associated with the resource object; and assigning values to the rights attribute therein, corresponding to the selected file rights.

14. The method of claim 13, further comprising:

providing a launcher for launching the resource;

requesting to the launcher on behalf of the consumer object a launch of the resource for providing a function for the node;

linking the resource object to the consumer object; and providing, to the node, the selected rights with respect to the resource, in association with the linking.

15. The method of claim 14, further comprising extending the linking to other resource objects equivalent to the resource object.

16. The method of claim 14, further comprising extending the linking to other consumer objects.

17. The method of claim 14, further comprising modifying the rights attribute.

18. The method of claim 14 further comprising:

providing an management executable for managing the values of the rights attribute; and providing a consuming executable for using the rights attribute to link the consumer object to selected rights, with respect to the resource object, upon association of the resource object with the consumer object.

19. The method of claim 14, further comprising dynamically linking the selected rights to the consumer object upon association.

20. The method of claim 14, further comprising dynamically linking the selected rights to the consumer object at run time.

* * * * *